INVENTOR.
RUDOLF R. SELIGER
BY
O. J. Bratlie
his ATTORNEY

Patented Mar. 18, 1952

2,589,874

UNITED STATES PATENT OFFICE 2,589,874

GYRO ERECTION SYSTEM

Rudolf R. Seliger, Palisades Park, N. J., assignor to Bendix Aviation Corporation, Teterboro, N. J., a corporation of Delaware Application June 30, 1949, Serial No. 102,389

12 Claims. (Cl. 74—5.47)

The present invention relates generally to gyroscopes and more particularly to a novel erection system therefor.

A non-pendulous vertical gyroscope when de-energized will automatically come to rest with its spin axis in some position other than that assumed when the gyroscope is operating normally. If the gyroscope is energized while in such a rest position, the spin axis will revolve about the true vertical, tracing a cone in space and gradually precess into the desired vertical position. It may take a considerable time before the spin axis attains the latter position. It is often inconvenient and in certain applications impossible to wait until the gyro reaches the desired operating position. If control equipment such as an aircraft automatic pilot, for example, should accidentally be energized while the gyro is precessing into its normal operating position it is possible to seriously impair the effectiveness of the automatic pilot.

It is, therefore, desirable to bring the gyro spin axis to true vertical before energizing the gyro and to prevent its connection to the control equipment before the gyro spin axis is in desired vertical position. Manual erection has been resorted to but this will erect the gyro with respect to the craft and not with respect to the true vertical and, furthermore, will not prevent premature energization of the control equipment connected for operation thereby.

The present invention contemplates the provision of novel means whereby a gyroscope is caused to assume automatically a normal operating position prior to its energization.

One object of the present invention, therefore, is to provide novel, simple and effective means for bringing the spin axis of a gyroscope into a desired reference position and thereafter applying power to the gyro to maintain the spin axis in the reference position.

Another object of the invention is to provide novel means for automatically bringing the spin axis of a gyroscope into a desired reference position.

Another object is to provide novel control means whereby the pitch and the bank axes of a vertical gyroscope are automatically oriented with respect to the true vertical prior to the application of power to the gyro rotor.

A further object is to provide novel erection means for a vertical gyroscope which will automatically bring the spin axis of the gyro to a true vertical position prior to the application of power to the gyro rotor together with means for disconnecting the erection means during a coordinated turn of the craft on which the gyro is mounted.

Another object is to provide novel gyro control means including a time delay relay whereby pitch and bank erection torque motors of an erection system are utilized to bring the spin axis of a vertical gyroscope into true vertical, prior to the application of power to the gyroscope.

Still another object of the invention is to provide a novel gyro erection system whereby the pitch and bank erection torque motors are utilized to center the gyroscope in the bank and pitch axis, respectively, and following a predetermined time interval energize the gyroscope and automatically connect said pitch and bank torque motors, respectively, for normal erecting operation.

These and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not intended as a definition of the limits of the invention.

In the drawings, wherein like reference characters refer to like parts in both views.

Figure 1:
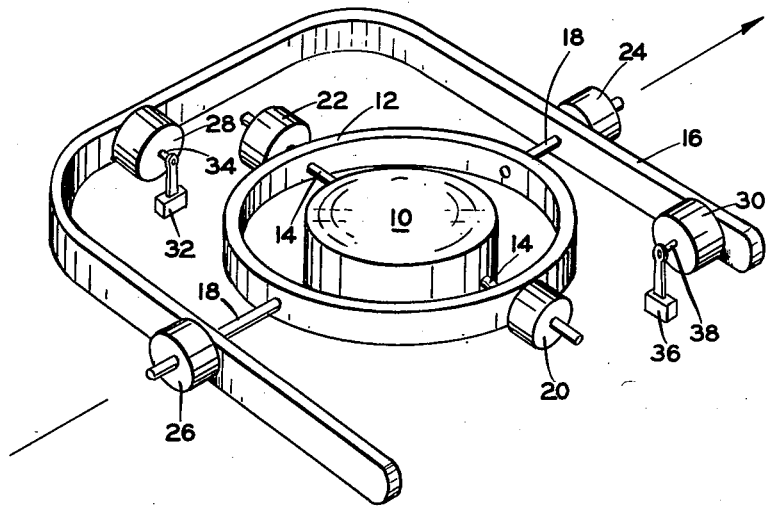
Fig. 1 is a perspective pictorial representation showing the relationship between the gyro and the various control units associated therewith.

For a better understanding of the present invention reference is had to Fig. 1 wherein a gyro vertical is illustrated comprising a rotor bearing case 10 within which the gyro rotor is mounted for spinning about a normally vertical axis.

Case 10 is rotatably journalled in a gimbal ring 12 by way of trunnions 14 and the gimbal ring is, in turn, journalled in a supporting member 16 by trunnions 18, the axis of trunnions 14 and 18 being mutually perpendicular to each other and to the spin axis. The supporting member 16 is fixed with respect to the craft on which the gyro is mounted.

The gyro may be mounted on a craft whose direction of flight is represented in the direction of the arrow so that the gyro axis defined by trunnions 18, may be termed the bank axis, and the axis defined by trunnions 14 may be termed the pitch axis. Fixed to the extreme ends of trunnions 14 are the rotor elements of an inductive pick-off device 20 and an erection motor 22. The stator windings of the pick-off device and the motor are mounted on gimbal ring 12. The rotor elements of pick-off device 24 and erection motor 26 are similarly mounted on the extremities of the trunnions 18 and the stator elements thereof are mounted on the supporting member 16. Also mounted on the supporting member are a pair of pendulous pick-off devices 28 and 30 whose rotor elements are journalled parallel to the pitch and bank axis, respectively. A pendulous mass 32 is clamped to the rotor shaft 34 of pick-off device 28 and a similar pendulous mass 36 is clamped to rotor shaft 38 of pick-off device 30 so as to maintain the rotors stationary with respect to the vertical by the gravitational force exerted on the pendulous masses about their respective axes.

Figure 2:
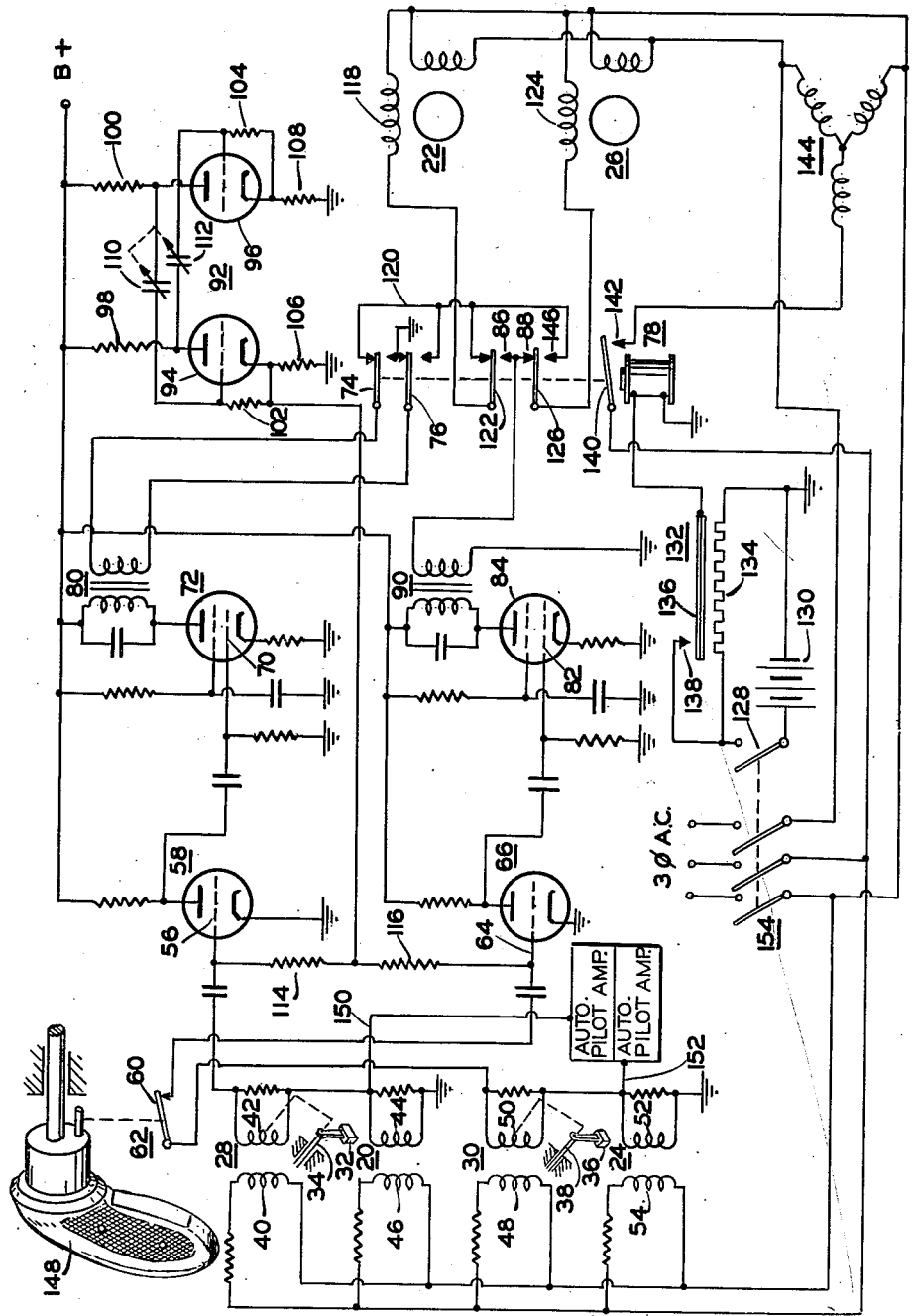
Fig. 2 is a schematic wiring diagram of one embodiment of the novel erecting means according to the present invention.

The pitch pendulous pick-off 28 is shown in Fig. 2 as comprising a fixed stator winding 40 excited from a source of A. C. power and a rotor winding 42 displaceable with respect to the stator winding and coupled to pendulum 32. Rotor winding 44 of pick-off device 20 is movable with trunnions 14 with respect to stator winding 46 and is connected in series with rotor winding 42. A similar arrangement is shown in the bank axis. A pendulous pick-off device 30 is shown as comprising a stationary stator winding 48 mounted on the supporting member 16 and a rotor winding 50 coupled to pendulum 36. Rotor winding 50 is connected in series with rotor winding 52 of pick-off device 24 whose stator winding 54 is also mounted on the supporting member 16.

The combined output of rotor windings 42 and 44 is connected to control grid 56 of amplifier tube 58 and the combined output of rotor windings 50 and 52 is connected to control grid 64 of amplifier tube 66 through normally closed contacts 60 of a switch 62.

The output of tube 58 is connected to control grid 70 of amplifier 72 whose output in turn is connected to contact arms 74 and 76 of a relay 78 through an output transformer 80. The output of amplizer 66 is similarly connected to control grid 82 of amplifier 84. The output of amplifier 84 is connected across interconnected contacts 86, 88 and ground through output transformer 90. Amplifiers 58, 66, 72 and 84 are supplied with operating D. C. potential from a common source of D. C. power. A detailed description of the amplifiers per se is not deemed necessary as such amplifiers are well known in the art.

A conventional multi-vibrator generally indicated by numeral 92 is shown as comprising a pair of triode tubes 94 and 96 whose plates are connected to the common source of D. C. power through a pair of plate resistances 98 and 100, respectively. Grid leak resistances 102 and 104 are connected to the respective cathodes of tubes 94 and 96. The cathodes are connected to ground potential through cathode resistances 106 and 108, respectively. The plate of tube 94 is connected to the control grid of tube 96 through a coupling capacitor 112 and the plate of tube 96 is connected to the control grid of tube 94 through a coupling capacitor 110. The capacitors are of the variable type and ganged together so that by increasing the capacitance of one of the capacitors the capacitance of the other will be decreased by a corresponding amount. As is well known in the art, the tubes of the multi-vibrator will conduct alternately, and the relative time the tubes are conducting depends on the relative capacitance of the coupling capacitors.

The frequency of the multi-vibrator is of course dependent upon the time constant of the respective capacitor-grid leak resistance values. By ganging the capacitors as shown, the frequency of the multi-vibrator may be kept constant while varying the on-off conducting periods of the tubes. With no current flowing through the tube there will be no potential drop across the corresponding cathode resistor. However, when the tube is conducting, a current will flow through the cathode resistor and a voltage proportional to the current will be developed across the resistor, the cathode becoming positive with respect to ground. This voltage will be in the form of a pulse of nearly square wave shape. The pulse appearing across cathode resistor 106 is used to control the gain of amplifiers 58 and 66, and for this purpose the grid leak resistors 114 and 116 of amplifiers 58 and 66, respectively, are connected to the cathode of multi-vibrator tube 94.

In the de-energized position of relay 78, as shown, the secondary winding of output transformer 80 is connected to ground on one side through contact arm 76 and to control winding 118 of erection motor 22 through contact arm 74, lead 120 and contact arm 122. One side of secondary winding of output transformer 90 of amplifier 84 is connected to ground and the other side thereof is connected to control winding 124 of erection motor 26 through contact 88 and contact arm 126. Relay 78 is actuated by closing switch 128 which will connect a source of electric power such as battery 130 of the control winding of the relay through a time delay device 132. The time delay device comprises a heater element 134, in heat exchanging relationship with bi-metallic strip 136, connected across the battery 130 when switch 128 is closed. The bi-metallic strip is normally out of engagement with contact 138. When switch 128 is closed and heater 134 is connected across the battery, bi-metallic strip 136 will be gradually heated and move toward contact 138. The time elapsed before strip 136 engages contact 138 depends on the particular design of the device and in the prsent illustration it will be assumed that contact will be made approximately 30 seconds after switch 128 has been closed. Actuation of relay 78 will cause contact arm 140 to engage contact 142 and close the third phase of the three phase gyro motor indicated at 144 which will not operate unless energized by all three phases of the A. C. supply. Actuation of relay 78 will also reverse the connection of secondary winding of transformer 80 so that the side previously connected to ground will now be connected to lead 120 and the side which previously was connected thereto will now be connected to ground. Simultaneously contact arm 122 will move against contact 86 and thus connect the secondary winding of transformer 90 to control winding 118 of erection motor 22 and contact arm 126 will move against contact 146 connected to lead 120 and thus connect the reversed secondary winding of transformer 80 to control winding 124 of erection motor 26.

Switch 62 is opened upon movement of a manual control unit 148 of an automatic pilot system in either direction to disconnect the erection motor 22 when the craft is placed into a coordinated turn.

Leads 150 and 152 from pick-offs 20 and 24 are connected to the amplifier of the automatic pilot in the usual manner and as the function of the automatic pilot has no bearing on the present invention further reference thereto will not be made.

The main three-phase breaker 154 is shown as being mechanically coupled to switch 128 so that the switch is closed simultaneously with the breaker.

Coming now to the operation of the above-described device, it will be assumed that the gyroscope is at standstill and that the rotor axis is at some position other than true vertical and that it is desired to bring the rotor spin axis into vertical prior to the application of power to the gyroscope. The main breaker 154 is closed whereby two of the windings of the gyro, the primary windings of pick-off devices 20, 24, 28 and 30 and the constant phase winding of motors 22 and 26 will be energized. Switch 128 is closed simultaneously with breaker 154 whereby current begins to flow through heater element 134 of time delay device 132. As previously described, with the relay 78 in de-energized position the combined amplified output from pick-off 20 and pitch pendulum 32 is connected to control winding 118 of erection motor 22 and the combined amplified output from pick-off 24 and bank pendulum 36 is connected to the control winding 124 of erection motor 26. In unaccelerated, straight, level flight, a signal proportional to the angle between the spin axis of the rotor and supporting member 12 about the pitch axis will be induced in the secondary winding 44 of pick-off device 20, and a signal proportional to the angle between supporting member 12 and the vertical about this axis will be developed in the secondary winding 42 of pitch pendulum 28. These signals are combined algebraically and the resulting signal will cause erection motor 22 to rotate casing 10 about trunnions 14 until the combined signal across the secondary windings 44 and 42 of inductive devices 20 and 28 is zero at which time the rotor spin axis will be in a true vertical position in the pitch axis. Similar action will take place about the bank axis wherein erection motor 26 will cause rotation of gimbal ring 12 about trunnions 18 until the signal from pick-off device 24 and bank pendulum 30 are equal and opposite at which time the pitch axis of the gyro defined by trunnions 14 will be in a true horizontal position. It is thus seen that the spin axis of the rotor will be brought to true vertical position regardless of the position of the mount and hence supporting member 16. Time delay device 132 is designed so as to delay the closing of relay 78 until complete erection has taken place at which time bi-metallic strip 136 has been heated to such an extent from heater element 134 as to engage contact 138. This will energize relay 78 to close the third phase of gyro 144 through contact arm 140 and contact 142.

It is well known in the art that in order to precess a spinning rotor, torque must be applied 90° away from the direction in which it is desired to have the axis precess. Thus it will be seen from Fig. 1 that in order to precess the spin axis in the transverse direction with respect to the direction of flight or in other words about trunnions 18 it will be necessary to apply the precessing torque from motor 22 and in order to precess the axis of rotation of the rotor in the direction of flight or about trunnions 14 it will be necessary to apply the precessing torque to motor 26. The reversal of the connections of motors 26 and 22 is accomplished as above described by the action of relay 78 which transfers the output of the secondary winding of output transformer 90 from contact arm 126 and control winding 124 of erection motor 26, to contact arm 122 and control winding 118 of erection motor 22. The relay simultaneously reverses the phase of the secondary winding of output transformer 80, disconnects it from control winding 118 of erection motor 22 and connects it to control winding 124 of the erection motor 26 through contact 146 and contact arm 126. Thus as soon as the time delay device 132 actuates relay 78 the gyro is energized and the connections of erection motor 22 and erection motor 26 are interchanged. Because of the particular arrangement of the components illustrated in Fig. 1 it is necessary to reverse the output phase of the secondary of transformer 80 when switched from one motor to the other, but as this feature is of small importance it is not deemed necessary to analyze the reasons for thus reversing the phase.

The precession rate used to erect a vertical gyro is usually a compromise between several conflicting factors. In order to obtain reliable erection even after considerable service of the gyroscope with consequent deterioration of the gimbal bearings, it is desirable to have a large erection torque. A large erection torque, however, will give the gyro a fast erection rate and thus cause it to follow the dynamic vertical instead of integrating it. In order to integrate the dynamic vertical the precession rate should preferably be very slow. In accordance with the teachings of copending application Serial No. 102,671, filed July 1, 1949, and assigned to the same assignee as the present application, multi-vibrator 92 is provided to block the amplifiers of the pick-offs during certain predetermined periods whereby a large erection signal of low average value may be applied to the torque motors. As was previously explained the conventional multi-vibrator 92 will cause a pulse to appear across cathode resistor 106 in the form of a periodic square wave. It has been found preferable to adjust ganged capacitors 110 and 112 so that the positive pulse will be of a duration of approximately 75% of the multi-vibrator cycle.

Amplifier tubes 58 and 66 are designed so as to operate normally with no voltage across resistor 106 or in other words with grid leak resistors 114 and 116 connected to ground potential. When a positive voltage pulse appears across resistor 106 grids 56 and 64 of tubes 58 and 66 are driven positive with the result that the tubes are saturated and no useable signal will be transmitted therethrough. Thus for the period the cathode of tube 84 is positive, the amplifiers will be made inoperative and no signal will be transmitted to the erection motors during this period. By varying the ganged capacitances 110 and 112 the period of inoperativeness of the amplifiers may be changed. In the present illustration the ganged capacitors were adjusted so as to cause the amplifiers to be inoperative during 75% of the time.

When it is desired to make a coordinated turn of the craft manual control unit or handle 148 of the automatic pilot is turned either to the right or the left as the case may be and this will open switch 62 to disconnect erection motor 22 because when the craft is making a coordinated turn the pendulum 36 will no longer indicate true vertical but will follow the dynamic vertical. When the manual control unit 148 is again returned to normal position for straight flight, switch 62 will again be closed.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Control means for bringing the spin axis of a three-degree-of-freedom gyroscope into a normally vertical position from an inoperative or rest position and for thereafter maintaining the spin axis in a normally vertical position, comprising torque motors associated with the bank and pitch axes of said gyroscope, means responsive to displacement of said spin axis from said normally vertical position about said bank and pitch axis, and means for connecting said displacement means for operating said bank and pitch torque motors for bringing said spin axis from an inoperative or rest position into a normally vertical position and for thereafter reversing connection of said displacement means with said bank and pitch torque motors to maintain said spin axis in said normally vertical position.

2. Control means for bringing the spin axis of a three-degree-of-freedom gyroscope into a normally vertical position from an inoperative or rest position and for thereafter maintaining the spin axis in a normally vertical position, comprising torque motors associated with the bank and pitch axes of said gyro, means responsive to displacement of said spin axis from said normally vertical position about said bank and pitch axes, pendulous means associated with the bank and pitch axes and responsive to displacement of said spin axis relative to said bank and pitch axes, and means for connecting said pendulous means for operating said bank and pitch torque motors for bringing said spin axis from an inoperative or rest position into a normally vertical position and for thereafter reversing connection of said pendulous means with said bank and pitch torque motors to maintain said spin axis in said normally vertical position.

3. Control means for bringing the spin axis of a three-degree-of-freedom gyroscope into a normally vertical position from an inoperative or rest position and for thereafter maintaining the spin axis in a normally vertical position comprising torque motors associated with the bank and pitch axes of said gyro, pendulous means associated with the bank and pitch axes and responsive to displacement of said spin axis from said normally vertical position about said bank and pitch axes, means for connecting said pendulous means for operating said bank and pitch torque motors for bringing said spin axis from an inoperative or rest position into a normally vertical position, and time delay means operative on the expiration of a predetermined interval of time for reversing connection of said pendulous means with said bank and pitch torque motors to maintain said spin axis in said normally vertical position.

4. Control means for bringing the spin axis of a three-degree-of-freedom gyroscope into a normally vertical position from an inoperative or rest position and for thereafter maintaining the spin axis in a normally vertical position comprising torque motors associated with the bank and pitch axes of said gyro, pendulous means associated with the bank and pitch axes and responsive to displacement of said spin axis from said normally vertical position about said bank and pitch axes, means for connecting said pendulous means for operating said bank and pitch torque motors for bringing said spin axis from an inoperative or rest position into a normally vertical position, and means for subsequently connecting said gyroscope with a source of power for spinning said gyroscope and for reversing connection of said displacement means with said bank and pitch torque motors to maintain said spin axis in said normally vertical position.

5. Control means for bringing the spin axis of the rotor of a gyro vertical into a normally vertical position from a rest position in which the rotor is stationary with its spin axis in a position other than a vertical position and for thereafter spinning said rotor in maintaining the spin axis in a normally vertical position, comprising a first torque motor for turning the rotor about one of its axes of suspension, a second torque motor for turning the rotor about another of its axes of suspension, means responsive to relative displacement of the rotor spin axis with said one axis of suspension connected for operating said first torque motor, means responsive to relative displacement of the rotor spin axis with said other axis of suspension connected for operating said second torque motor, said responsive means acting to operate said motors whereby said rotor spin axis is brought into a normally vertical position, and means operative after said spin axis is brought to its normally vertical position for spinning said rotor and for disconnecting said first responsive means from said first torque motor and for connecting it with said second torque motor and for disconnecting said second responsive means from said second torque motor and for connecting it to said first torque motor.

6. Control means for bringing the spin axis of a three-degree-of-freedom gyroscope into a normally operative position thereof about a predetermined axis and for thereafter maintaining the spin axis in operating position, comprising a pick-off device associated with an axis of said gyroscope for developing a signal across an output thereof as a function of the deviation of said spin axis from normal operating position about said axis, torque means associated with said axis, torque means associated with an axis of said gyroscope perpendicular to said axis, means including a time delay device for connecting said pick-off device and said torque means to a source of energizing power and for connecting said first-mentioned torque means for operation in response to signal across said output of said pick-off device for bringing the spin axis to operating position and after a predetermined time interval established by said time delay device for disconnecting said first-mentioned torque means and connecting said second-mentioned torque means to the output of said pick-off device and simultaneously energizing said gyro.

7. Control means for bringing the spin axis of a gyroscope to normal operating position about a certain axis prior to the energization of said gyroscope, and for thereafter maintaining the spin axis in normal position comprising a pick-off device mounted for developing a signal across an output thereof as a function of the amount said spin axis is off operating position about said axis, a torque device associated with said axis, a torque device associated with an axis perpendicular to said certain axis, switching means including a time delay device for connecting said output of said pick-off device to said first-mentioned torque device and for connecting said pick-off device and said torque means to a source of energizing power to cause said first-mentioned torque means to bring said spin axis to operative position about said certain axis, and after a predetermined time interval determined by said time delay device for disconnecting said output of said pick-off device from said first-mentioned torque device and connecting it to the second-mentioned torque device and simultaneously energizing said gyro.

8. In a system for erecting the spin axis of the rotating element of a gyro during normal operation thereof comprising bank pick-off means and bank axis erection means operative in response to signals from said bank pick-off means, and pitch pick-off means and pitch erection means operative in response to signals from said pitch pick-off means, means for erecting the gyro spin axis to vertical prior to the energization of the gyro comprising switching means for interchanging response of said bank axis erection means and said pitch axis erection means so that the bank axis erection means is operative in response to signals from said pitch pick-off means and said pitch axis erection means is operative in response to signals from said bank pick-off means, and means for automatically operating said switching means to connect said bank axis erection means and said pitch axis erection means for normal operation and simultaneously energize said gyro after a predetermined time interval.

9. Control means for bringing the spin axis of the rotating element of a gyroscope to normal operating position prior to the energization of said gyroscope comprising an inductive pick-off device for developing across an output thereof a signal proportional to the amount the spin axis is off normal operating position in a certain axis with respect to a mount for the rotating element, an inductive pick-off device for developing across an output thereof a signal proportional to the amount the mount is off in said axis, means for combining said outputs, torque means for bringing said spin axis to operative position in said axis when the rotating element is at rest, said torque means being connected to the combined outputs and operative in response to the combined signals of said two inductive pick-off devices, torque means associated with an axis transverse to said first-mentioned axis, and switching means including time delay means for disconnecting said first-mentioned torque means from the combined outputs of said pick-off devices after a predetermined time interval and connecting said second-mentioned torque means to said combined outputs and simultaneously energizing said gyroscope.

10. In a gyro vertical erection system comprising pitch axis torque means for erecting the spin axis into a normally vertical position about the pitch axis operative in response to pitch axis pick-offs during normal operation of the gyroscope, and bank axis torque means for erecting the spin axis about the bank axis into a normally vertical position operative in response to bank axis pick-offs, means including a time delay device for interchanging the connections of said pitch axis torque means and said bank axis torque means for bringing said spin axis to vertical position when the gyro is at rest and after a time interval determined by said time delay device for connecting said torque means for normal operation and for energizing said gyro.

11. In a system for erecting an operating gyro vertical in the bank and pitch axis having bank pick-off means and bank erection means and pitch pick-off means and pitch erection means, means for bringing the gyro to normal operating position prior to the energization thereof including means for utilizing said bank erection means for erecting the gyroscope in the pitch axis and means for utilizing said pitch erection means for erecting said gyroscope in the bank axis.

12. In a gyroscope having a spin axis movable about mutually perpendicular axes at an angle to said spin axis, means responsive to displacement of said spin axis from a predetermined attitude, torque means for moving said spin axis about said mutually perpendicular axes, and means for rendering said torque means responsive to said displacement means to move said spin axis about said mutually perpendicular axes from a rest position substantially to said predetermined attitude and then reversing response of said torque means to said displacement means.

RUDOLF R. SELIGER.

REFERENCES CITED

The following references are of record in the file of this patent:

UNITED STATES PATENTS

| Number | Name | Date |
| --- | --- | --- |
| 2,297,268 | Von Manteuffel | Sept. 29, 1942 |
| 2,429,605 | Brannin | Oct. 28, 1947 |
| 2,441,307 | Alkan | May 11, 1948 |